United States Patent
Giacobbi (10) Patent No.: US 11,325,302 B2
(45) Date of Patent: May 10, 2022

(54) METHOD AND SYSTEM FOR COMPOSITE-BASED ADDITIVE MANUFACTURING

(71) Applicant: Xerox Corporation, Norwalk, CT (US)

(72) Inventor: James Lawton Giacobbi, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 288 days.

(21) Appl. No.: 16/263,296

(22) Filed: Jan. 31, 2019

(65) Prior Publication Data

US 2020/0247045 A1     Aug. 6, 2020

(51) Int. Cl.
| | |
|---|---|
| *B29C 67/00* | (2017.01) |
| *B29C 64/209* | (2017.01) |
| *B29C 64/165* | (2017.01) |
| *B29C 64/245* | (2017.01) |
| *B29C 64/295* | (2017.01) |
| *B32B 5/26* | (2006.01) |
| *B33Y 30/00* | (2015.01) |
| *B33Y 10/00* | (2015.01) |

(52) U.S. Cl.
CPC .......... *B29C 64/209* (2017.08); *B29C 64/165* (2017.08); *B29C 64/245* (2017.08); *B29C 64/295* (2017.08); *B32B 5/26* (2013.01); *B32B 2250/20* (2013.01); *B32B 2262/106* (2013.01); *B33Y 10/00* (2014.12); *B33Y 30/00* (2014.12)

(58) Field of Classification Search
CPC ... B29C 64/209; B29C 64/245; B29C 64/295; B29C 64/165; B32B 5/26; B32B 2250/20; B32B 2262/106; B33Y 10/00; B33Y 30/00; B33Y 50/00; B33Y 50/02

See application file for complete search history.

(56) References Cited

U.S. PATENT DOCUMENTS

| | | | |
|---|---|---|---|
| 2006/0255525 A1 | 11/2006 | Dinatale et al. | |
| 2013/0171431 A1 | 7/2013 | Swartz et al. | |
| 2014/0085620 A1 | 3/2014 | Lobovsky et al. | |
| 2014/0203479 A1* | 7/2014 | Teken | B33Y 10/00 264/401 |
| 2014/0370323 A1* | 12/2014 | Ackelid | B23K 26/342 428/548 |
| 2016/0082695 A1* | 3/2016 | Swartz | B32B 5/22 428/172 |
| 2016/0297142 A1 | 10/2016 | Bheda et al. | |
| 2017/0106586 A1 | 4/2017 | Keoshkerian et al. | |

* cited by examiner

*Primary Examiner* — Ryan M Ochylski
(74) *Attorney, Agent, or Firm* — Caesar Rivise, PC (57) ABSTRACT

A system and method are provided enabling higher precision in composite based additive manufacturing ('AM"). The method includes staging a fibrous material such as carbon fiber sheets by potentially cutting to length and placing a sheet onto an elevator. Above the elevator is a gantry that holds a moveable print head and a powder deposition device as well as an excess powder recapture device. A liquid is placed onto the fiber by the print head such that when the subsequent step of dusting the area with a plastic powder, the powder sticks to the area where the liquid was imaged. Subsequently, excess powder is removed and pressure and potentially heat are applied to sinter the layer and compress to the desired height.

15 Claims, 7 Drawing Sheets

METHOD AND SYSTEM FOR COMPOSITE-BASED ADDITIVE MANUFACTURING

BACKGROUND

Disclosed herein are methods and systems for composite-based additive manufacturing, and in particularly to such process that render individual laminate layers to be built up to form and/or manufacture three-dimensional objects, parts and components (3D objects).

Traditional object, part and component manufacturing processes, which generally included varying forms of molding or machining of output products, have expanded to include commercial implementations of a new class of techniques globally referred to as "additive manufacturing" or AM techniques. These AM techniques generally involve processes, alternatively referred to as "Solid Freeform Fabrication (SFF)" or "3D printing" in which layers of additive materials, sometimes toxic or otherwise hazardous in an unfinished state are sequentially deposited on an in-process 3D object according to a particular material deposition and curing scheme. As each layer is added in the 3D object forming process, the new layer of material is added and adhered to the one or more already existing layers. Each AM layer may then be individually cured, at least partially, prior to deposition of any next AM layer in the 3D object build process. This sequential-layer material addition/joining throughout a 3D work envelope are executed under automated control of varying levels of sophistication.

AM (or 3D printing) techniques often employ one or more processes that are adapted from, and appear in many respects to be similar to, well-known processes for forming two-dimensional (2D) printed images on image receiving media substrates. The significant differences in the output structures produced by the 3D printing techniques are generally based on (1) a composition of the deposited materials that are used to form the output 3D objects from the AM device/system or 3D printer; and (2) a number of passes made by the printing systems in depositing comparatively large numbers of successive layers of the deposition material to build up the body of material to the form of the output 3D objects.

A number of powder-based AM techniques have been commercialized. These include Selective Laser Sintering (SLS), as well as certain adaptations of toner-based 2D printing technologies for 3D printing. Those of skill in the art recognize that, in certain of these implementations, no separate support structures are typically required to support the creation of certain complex shapes. In certain of these processes, powdered materials are selectively consolidated into 3D objects with excess powder being manually removed. In an SLS process, for example, a thin layer of powder is deposited in a workspace container and the powder is then fused together using a laser beam that traces the shape of the desired cross-section. The process is repeated by depositing layers of powder thus building the 3D object in this manner layer by layer. In a typical toner-based 3D printing process, a binder material selectively binds powder deposited in layers in a printing technology used to generally print the binder in a shape of a cross-section of the 3D object on each layer of powder.

An expanding number of AM or 3D printing processes and techniques are now available. Principal distinguishing characteristic between the multiplicities of these AM or 3D printing processes are in the manner in which the layers are deposited to create the output 3D objects, and in the materials that are used to form the output 3D objects.

Certain of the AM techniques (as this term will be used throughout the balance of this disclosure to refer to various 3D object layering and build techniques including 3D printing) melt or soften materials to produce the build layers using techniques such as, for example, selective laser melting or sintering of an input material through applied heat. Others of the AM manufacturing techniques deposit and cure liquid materials using technologies for the deposition of those liquid materials such as jetted (ink) material "printing" techniques.

During the object layering a miss-registration of the pressed layer due to sheet cutting and stacking variations, potentially resulting in lower part quality. Additionally, mis-registration as large as 100 to 250 microns can occur due to electro-mechanical complexities in the movements and interactions of components that make up the image forming systems and that are responsible for such image-on-image registration. Such mis-registrations, in a form of overlap of part components of a single layer and support components of that single layer, may similarly arise in systems for performing electrophotographic layered AM when using a support layer and attempting to properly register the support layer component to the part layer component.

In view of the above known concern with regard to certain registration inaccuracies, it would be advantageous to develop an advanced layered electrophotographic AM 3D object forming system and/or technique that provides significantly increased piece part accuracy of electrophotographic layer AM 3D objects by introducing a process that enables a substantially perfectly registered part layer component relative to a support layer component in each xerographically formed 2D slice laminate for building the 3D object.

SUMMARY

According to aspects of the embodiments, there is provided process and architecture for enabling higher precision in composite based additive manufacturing ('AM"). The process includes staging a fibrous material such as carbon fiber sheets by potentially cutting to length and placing a sheet onto an elevator. Above the elevator is a gantry that holds a moveable print head and a powder deposition device as well as an excess powder recapture device. A liquid is placed onto the fiber by the print head such that when the subsequent step of dusting the area with a plastic powder, the powder sticks to the area where the liquid was imaged. Subsequently, excess powder is removed and pressure and potentially heat are applied to sinter the layer and compress to the desired height. The elevator is moved down and the next fiber layer is stacked and the process repeats. In this method, each layer of the part is assembled in a stepwise fashion until the entire part is built.

DETAILED DESCRIPTION

Aspects of the embodiments disclosed herein relate to methods for selective laser sintering of thermal plastics, and corresponding apparatus and computer readable medium. The disclosed embodiments include a high productivity technique to manufacture parts with selective laser sintering. High productivity is attained without having to significantly change the process by using an anamorphic projection system.

Exemplary embodiments are intended to cover all alternatives, modifications, and equivalents as may be included within the spirit and scope of the composition, apparatus and systems as described herein.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof. In the drawing, like reference numerals are used throughout to designate similar or identical elements.

The disclosed embodiments include an object manufacturing system, the system comprising: a movable platform to receive a build surface; a material depositing system configured to deposit a layer of material onto the build surface; and a heated plenum that can selectively/partially or completely cure the deposited layer of material on the build surface; wherein each layer of an object is assembled in a stepwise fashion until the entire object is built.

In another aspect, the disclosed embodiments further comprise an apparatus to cut the build surface to a predetermined size and to place the build surface on the movable platform.

In yet another aspect, the disclosed embodiments further include wherein the deposited layer of material includes at least one layer column.

In yet another aspect, the disclosed embodiments further comprises a heated plenum with selected surfaces heated to apply heat to the at least one layer column.

In another aspect, the disclosed embodiment wherein the material depositing system further comprising an array of print heads to print a layer shape of the object on the build surface; a material deposition apparatus to deposit a powder on the build surface; and a cleaning unit to remove deposited powder that is not stuck to the printed layer shape of the object.

The disclosed embodiments to an object manufacturing system wherein the printed layer shape of the object is fluid base.

The object manufacturing system wherein the movable platform can decrement by approximately the thickness of a build surface and deposited layer of material.

The disclosed embodiments to an object manufacturing system wherein the heated plenum heats the deposited layer of material and compresses the deposited layer of material to a predetermined height.

The disclosed embodiments to an object manufacturing system further comprising a controller configured to control plenum motion and plenum applying pressure to selectively or completely cure the deposited layer of material on the build surface.

The disclosed embodiments further include a method of printing an object onto a build platform using a printing system, the method comprising: causing a movable platform to receive a build surface; causing a material depositing system to deposit a layer of material onto the build surface; and using a heated plenum to selectively or completely cure the deposited layer of material on the build surface; wherein each layer of an object is assembled in a stepwise fashion until the entire object is built.

The disclosed embodiments further include at least one machine-readable medium comprising a plurality of instructions, when executed on a computing device, to implement or perform a method as disclosed herein. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

As used herein, unless otherwise specified, the term "object" can also mean part, element, piece, or component. As used herein, an object refers to a 3D object to be individually built, or actually built, by a 3D printing system (printer). An object, as referred herein, is built by successively adding layers so as to form an integral piece. Some printers are capable of building, as part of the same print job, a plurality of independent pieces from a 3D model including a plurality of independent 3D objects. An object may include void spaces embedded in the object body.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations. The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

As used herein, unless otherwise specified, the word "printer" encompasses any apparatus that performs a print outputting function for any purpose, such as a digital copier, bookmaking machine, facsimile machine, a multi-function machine, electrostatographic device, 3D printer that can make a 3D objects, and the like. It will be understood that the structures depicted in the figures may include additional features not depicted for simplicity, while depicted structures may be removed or modified.

The 3D printing process using a line laser print head is similar to a standard Selective laser sintering (SLS): 1) Prepare a layer of fresh powder on top of existing powder bed; 2) Sinter the powder with the line laser print head; and, repeat the steps until finish. Move the powder bed or the print head vertical position between the steps to accommodate the thickness of each powder layer. SLS is applicable to both metal and thermoplastics. The only significance difference is that metal SLS can reach a few thousand watts and thermoplastic SLS is around a few hundred watts.

Thermoplastic SLS is fundamentally challenged by a process physics problem: the limit on power density to prevent the burning/degradation of the build material. In order to sinter/melt the thermal plastic material, a certain amount of energy needs to be delivered to a certain area (Energy/Area) to raise the temperature of a layer of the material. If one increases the speed, while increasing the laser power accordingly, this energy density requirement can be met. However, the power density (Power/Area, Watts/mm^2) increases proportionally. The increased power density will cause the energy/heat to concentrate more and more on the top surface, causing the overheat of the material siting on the top of the layer. There is proposed and described in the various embodiments using a high power 1D line laser imager for Selective Laser Sintering of thermal plastics by producing an imaging area that is a line with high resolution spatial/temporal power modulation.

The terms "media", "web", "web substrate", "print substrate" and "substrate sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, non-woven fabrics, metal films, carbon fiber reinforced material and foils, as readily understood by a skilled artisan.

Figure 8:
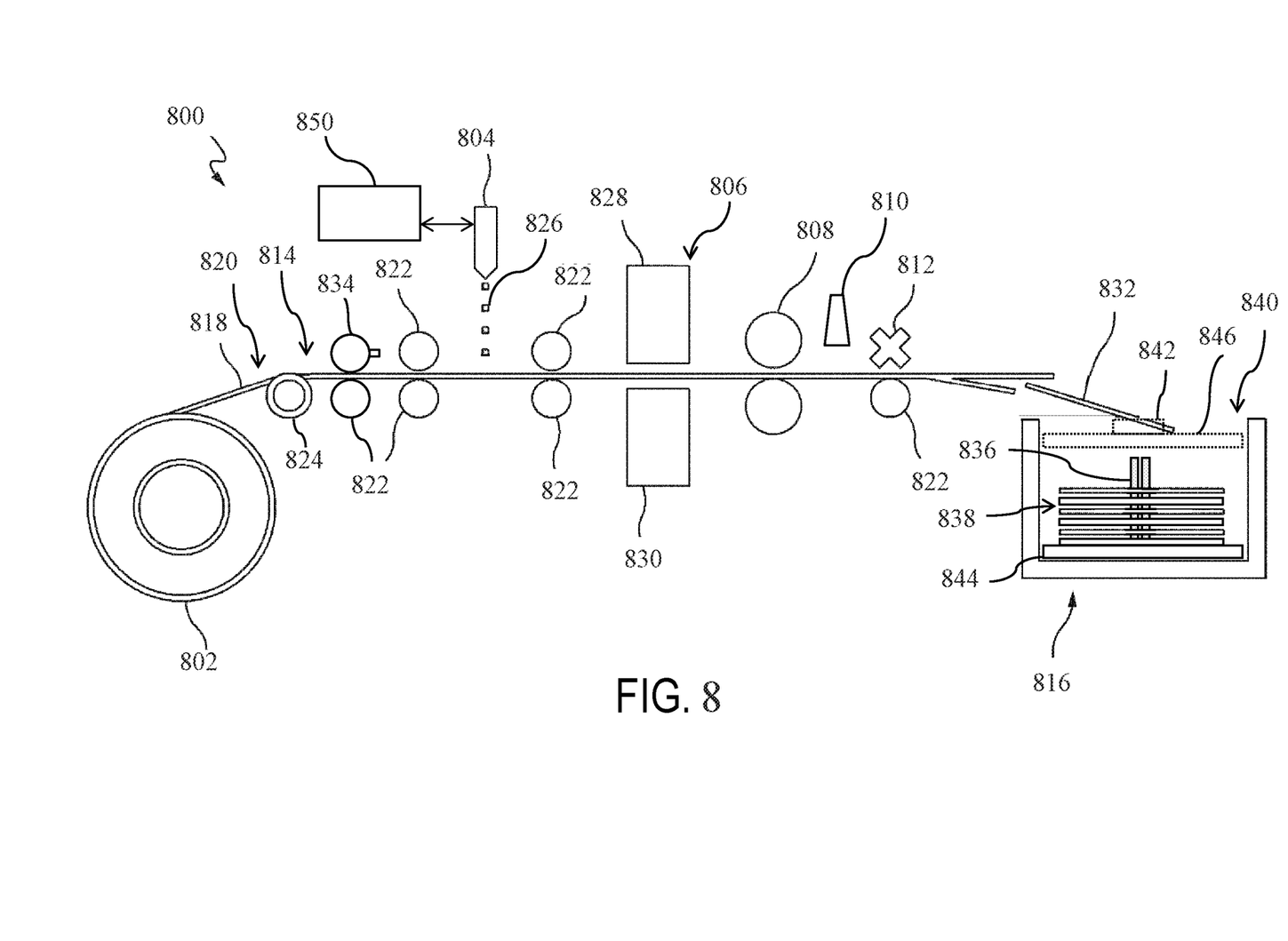
FIG. 8 is a block diagram of some of the components of an additive manufacturing system in accordance to an embodiment.

FIG. 8 is a block diagram of an exemplary AM system 800 for printing 3D objects. The AM system 800 may include components such as a material feeder 802, an image-forming device 804, a powder subsystem 806, a fuser 808, a sensor 810, a cutter 812, a transfer subsystem 814, a stacker subsystem 886, and other features that connect and control the various components. While exemplary components are shown in FIG. 8, various alternative and optional components are also suitable for use with the system 800.

In illustrative implementations, a three-dimensional (3D) object is printed in accordance with a computer 3D model of the object, created by a computer-aided design (CAD) program. For example, the CAD program may be a freeform non-uniform rational basis spline (NURBS) program, or the CAD program may be Solid Works®. In the AM system 800, powder is selectively deposited by powder subsystem 806 in a physical pattern on a substrate material 818 (or substrate sheets thereof) that corresponds to a "positive image' of a thin slice or layer of the 3D object as defined by image forming device 804. For each slice of the 3D object, powder is attached in a pattern that correspond to positions in the slice where the 3D object exists, and powder is not attached to the substrate in positions in the slice where the 3D object does not exist. Thin slices of the 3D CAD model may be created, for example, by starting with a 3D model in STL file format and using the Slice Commander feature of Netfabb® Studio software (available from netfabb GmbH, Parsberg, Germany) to create the thin slices. This cycle of selectively patterning substrate sheets repeated for as many additional substrate sheets as required for making the specified 3D part or object, with each sheet normally representing a layer of the 3D part or object.

The material feeder 802 holds the substrate material 818 (e.g., carbon fiber, paper) in roll or sheet form (here shown in roll form for example) and places the substrate material in proper position for transfer to the image-forming device 804. The substrate material 818 may be transferred to the image-forming device 804 via the transfer subsystem 814, which may include a tensioning mechanism 820 together with feed rollers 822 used to hold and advance the web defined by the length of the substrate material fed through the AM system 800. The tensioning mechanism 820 may include one or more rollers 824 situated to keep the substrate material 818 taught as it is fed components of the AM system. The web of substrate material 818 can extend through all of the components of the AM system, including the image-forming device 804, the powder subsystem 806, the fuser 808, the sensor 810, and then be cut by the cutter 812 into single sheets prior to stacking, as discussed in greater detail below.

The image-forming device 804 may then deposit a pattern of fluid 826 in image-wise fashion at precise locations onto the substrate material 818. The fluid 826 is selectively deposited on the substrate material 818 so that some parts of the material are covered with liquid as a positive image of a slice of a 3d object, and some parts of the material are not. The pattern of fluid 826 may be deposited via a variety of approaches. For example, the image-forming device 804 may include a thermal inkjet head or a piezoelectric inkjet head to dispense the fluid. In examples, the image-forming device 804 may apply air pressure to dispense the fluid 826. The image-forming device 804 may also include a solenoid valve if air pressure is used to control the release of air or dispensing of fluid.

In some cases, the fluid that is selectively deposited may be water or an aqueous solution that includes a material that slows the evaporation of water. For example, the aqueous solution may include 2-pyrrolidinone. In other cases, a different fluid, such as an alcohol may be selectively deposited. For example, if the substrate material 818 is water sensitive (e.g. polyvinyl alcohol, PVOH), then water may distort or dissolve the substrate material. In that case, an alcohol may be used as the fluid that is selectively deposited. In some cases, to prevent a liquid fluid that is selectively deposited from spreading or being excessively absorbed into the substrate, it is helpful to apply a surface energy modifier or repellent to the substrate before selectively depositing the liquid fluid.

The material feeder 802 then transfers the substrate material 818 to the powder subsystem 806, which includes a powder applicator 828 and a powder remover 830 that may be provided as separate components or integrated into a single component. In either arrangement, the powder applicator 828 is configured to deposit a 3D object powder (e.g., thermoplastic powder) onto the substrate material. The powder is configured to adhere to the areas of the substrate that have been made wet by the image-forming device 804, i.e., the layer images. In other words, the powder applicator 828 deposits powder, such as, but not limited to, thermoplastic powder, onto the surface of the substrate material 818 on which patterned layer shapes have just been printed. The powder sticks to the printed (wet) areas on the sheet, but does not adhere to portions of the substrate that are not covered with the fluid.

In typical application, the powder applicator 828 may include a trough containing the powder. The trough may have a slotted or slitted opening (such as a long/short narrow cut, eyelet, or puncture) on its underside and is connected to an electromechanical vibrator of the powder subsystem. The vibrator, when active, causes the powder to flow downward through the slitted opening and out of the trough onto the substrate while it moves under the trough. The vibrator is actuated by a controller 850 like controller 500 that may include a sensor circuit that senses the presence of the patterned fluid on the substrate underneath. When the patterned fluid has completely passed, the vibrator may deactivate to cease powder flow from the trough.

The powder may be selectively deposited by other approaches. For example, the powder may be selectively deposited by flooding one side of a layer of substrate with powder, then selectively heating the opposite side of the substrate with an appropriate device such as a thermal print head. In this approach, the thermal print head includes a high-resolution array of heating elements, which may be selectively turned on or off. In the areas that are heated, the powder melts and adheres to the substrate. The excess powder that has not adhered is removed, for example by vacuuming the excess powder by the powder remover 830 or turning the substrate over with the excess powder falling off the substrate via gravity.

Alternatively, powder may be deposited using a selective deposition technique similar to that employed in xerographic printing. In this approach, an electrical charge is imparted to powder particles, which are directed toward the substrate 818 and then selectively adhere to some portions of the substrate, but not others due to electrostatic attraction or repulsion. The powder particles adhere to portions of the substrate that have an opposite electrical charge, or that are adjacent to a substrate surface that has such a charge, and are repelled from portions of the substrate that have the same electrical charge or that are adjacent to a substrate surface that has such a charge.

The powder may be alternatively deposited using a selective deposition technique similar to that employed in magnetographic printing. In this approach, powder selectively adheres to some portions of the substrate layer, but not others due to magnetostatic interactions between the powder and the substrate surface, or a substrate layer adjacent to the substrate surface. For example, the powder may be a single component magnetic toner, a colloidal suspension (e.g., a ferrofluid), or a dual component toner. A variety of magnetic pigments, such as magnetite (FeO) or ferric oxide ((FeO), may be used for the toner in this approach.

In all of the above examples, the step of selectively depositing powder may include a sub-step of directing solid powder toward the substrate 818 in a non-selective manner. For example, this sub-step may include flooding the entire surface of the substrate with powder. Or for example, in the xerographic or magnetographic examples, this sub-step may include sending electrically charged or magnetized powder toward the entire substrate layer Still referring to FIG. 8, the powder remover 830 then removes any powder that does not adhere to the substrate. The powder may be removed from the substrate, for example, by vacuuming the excess powder off as it moves adjacent the powder remover. In typical application, the powder remover 830 may include a vacuum having a vacuum motor coupled to a cyclone (to be described later). In operation, the vacuum pulls the powder that does not adhere to the substrate, while powder applied to the printed areas remain. The cyclone may recirculate the vacuumed powder back to the powder applicator 828 for reuse, as well understood by a skilled artisan. In certain circumstances the amount of powder removal from the vacuum may be insufficient since some unwanted powder may still reside on the substrate material. For this reason the powder remover 830 may include an air knife after the vacuum to remove any remaining excess powder from the substrate. The removed excess powder may also be recirculated by the cyclone back to the powder applicator for reuse.

The powder system 806 can be set to run continuously so that, once the substrate material 818 passes the image forming device 804, the substrate automatically travels through the powder system 806. Alternatively, the controller 850 in communication with the transfer subsystem 814, the image forming device and the powder system 806 can instruct the powder applicator 828 and powder remover 830 or subsystems thereof to turn on and off at the appropriate times.

After the substrate 818 has had powder applied and excess powder removed, the remaining powder may be melted onto the substrate so that the powder more permanently affixes to the printed areas of the substrate and is thus protected from displacement, disruption, or falling off during subsequent processing steps. To this end, an optional fuser 808 may be disposed after the powder system 806. The fuser 808 may be disposed above, below, or adjacent to the substrate leading out of the powder remover 830. The fuser 808 may be, for example but not limited to, radiant, IR, or other heating approach sufficient to melt and thereby fix the patterned powder to the substrate. As the substrate 818 travels out of the powder system 806, the heat from the fuser 808 melts the powder on the substrate surface causing it to fix to the substrate.

The AM system 800 may optionally have a sensor 810 (e.g., an imaging device such as a camera) to ensure that the system has not malfunctioned, that the appropriate amount of powder is deposited, that the substrate is moving as desired, that individual substrate sheets are moving as desired, and other quality assurance aspects of the process. The sensor may operate based, for example, on input from the controller 850, or automatically upon detection of an edge of printed material or a substrate sheet.

As noted above in the exemplary AM system 800, the roll 802 of substrate material 818 is mounted and situated ahead of the image-forming device 804. While not being limited to a particular theory, the web of substrate material 818 can extend through all of the components of the AM system, including the image-forming device 804, the powder subsystem 806, the fuser 808, the sensor 810, and then be cut by the cutter 812 into single sheets 832 prior to stacking. In examples, the web of substrate material 818 may be cut by the cutter 812 into single sheets 832 at any prior point in the process. For example, the web may be converted to a single sheet prior to advancing the resulting substrate sheet to the image-forming device 804. Likewise, the web may be converted to a single sheet after the image-forming device 804 and before the powder subsystem 806, or after the powder subsystem and before the fuser 808, or after the fuser and before the sensor 810. In examples, the web may be precut into individual sheets, with the sheets arranged as a stack of sheets held by the material feeder for individual processing by the AM system. The cutter 812 may cut the sheet with a mechanical instrument (e.g., blade, punch) or other approach (e.g., laser) as well understood by a skilled artisan.

In examples, the AM system 800 may also include a punching device 834 for placing registration holes in the substrate material 818 or substrate sheets 832 thereof at desired locations. The registration holes are placed in precise, pre-defined positions relative to the position of the substrate sheet for precise alignment of the patterned marking material images printed onto the sheets. This can be accomplished by mounting the punching device 834 proximate to the substrate material 818 being moved by the transfer subsystem 814, for example, on the same frame that the image-forming device 804 and powder subsystem 806 are placed, or using other alignment mechanisms that are well known in the art. The punching device 834 may include a hard instrument that pokes registration holes out of the substrate material, or a laser cutter that cuts registration holes from the substrate material.

In order to complete the AM process of forming a 3D object, the powder printed substrate sheets 832 may be stacked by aligning the substrate sheets via their registration holes, and fused together to attach the stacked substrate sheets into the combined object. Then the uncoated substrate material may be removed from the combined object by, for example, abrasive blasting, chemical removal or dissolution. The stacker subsystem 886 is configured for stacking the cut printed substrate sheets 832 in register, based on the aforementioned registration holes. As can be seen in FIG. 8, the stacker subsystem 886 receives the printed substrate sheets 832 with the registration holes aligned about registration pins 836 of the stacker subassembly to form a stack 838 of the printed sheets.

After stacking the printed sheets, the patterned powder on the sheets may be combined and hardened into the 3D object. FIG. 8 shows the stacker subsystem 886 including a compressive device 840 including one or more elastic components (e.g., springs 842) to maintain pressure on the substrate sheets 832 even if they compress. After a number of substrate sheets (layers) have been placed in the stacker subsystem 886, one on top of the other on bottom plate 844, the inserted substrate sheets may be compressed together with the spring 842 exerting presser on top plate 846 towards the bottom plate.

The compressed stack 838 may be heated, for example, in an oven (not shown). Heat from the oven causes the thermoplastic powder to melt. The molten material coats the substrate layers. The compressive device 840, with the substrate stack 838 in it, is then removed from the oven, and the substrate layers are allowed to cool. The molten material then solidifies. As it does so, it binds (fuses) the substrate sheets 832 together. Excess substrate (that has not been covered by the solidified material) is then removed as noted above by, for example, abrasive blasting, chemical removal or dissolution.

The process carried out by the AM system 800 may be sequenced and monitored using one or more controllers 850. For example, the material feeder 802, image-forming device 804, powder subsystem 806, fuser 808, sensor 810, cutter 812, transfer subsystem 814, punching device 834 and stacker subsystem 886 may operate as discussed herein based on input from the controllers. Thus while the controller 850 is shown in communication with the image-forming device 804, it is understood that the controller may be in communication with any component of the AM system.

Figure 1A:
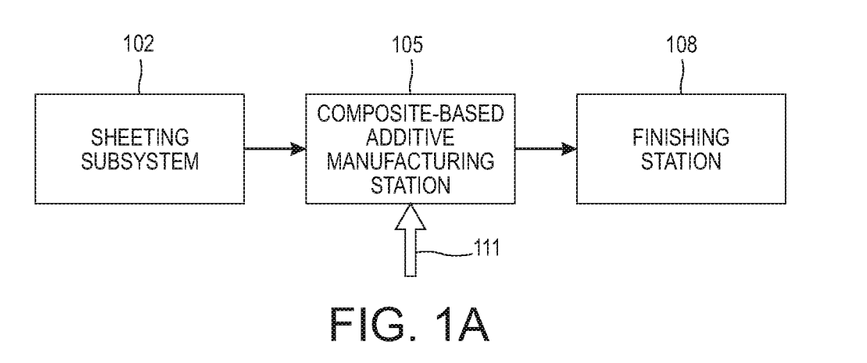
FIG. 1A is a block diagram of a system for printing 3D objects in accordance to an embodiment.
Figure 1B:
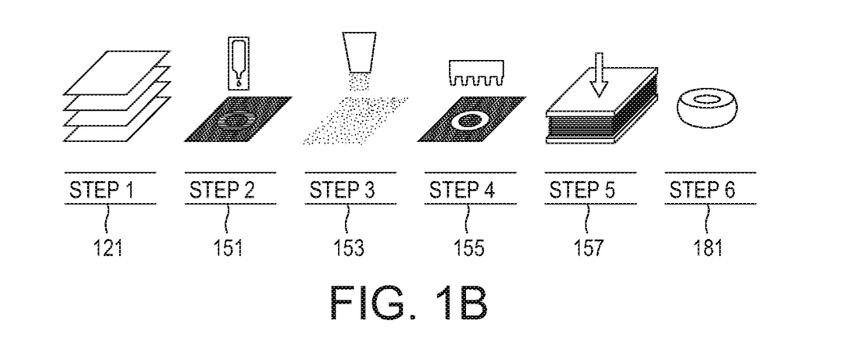
FIG. 1B shows the process steps for composite-based additive manufacturing of objects in accordance to an embodiment.

FIG. 1A is a block diagram of a system for printing 3D objects while FIG. 1B shows the process steps for composite-based additive manufacturing of objects in accordance to an embodiment. Refer first to FIGS. 1A and 1B, which illustrates a representative additive manufacturing system (1A) and process steps (1B). The system includes sheeting subsystems 102 containing various mechanical, optical, electrical and electronic components that operate to cut, size, and transport build surfaces such as a sheet to a composite-based additive manufacturing (CBAM) station 105. CBAM 105 solves the need in the art for improvements in productivity, object quality and parts size in additive manufacturing. The CBAM station produces the object based on a received input image 111 after generating a model of the object with thickness, quantity of material, pressure and heat to apply during the manufacturing process. Operation of the CBAM station 105 may be understood with reference to FIGS. 3 and 4. The illustrated system utilizes a reverse stereolithographic process by which an object is built up in layers on a downwardly facing receiving surface known as an elevator at the CBAM station 105. When a layer is completed, the height of the elevator is lowered so that another solid layer can be cured by a heat source to adhere to the previously deposited layer. The process is repeated until the 3D object is fully formed on the elevator surface of CBAM station 105.

The fully formed 3D object is then processed by a finishing station. A finishing station 108 applies finishing work such as a painting, smoothing, shaping like grinding/sanding and the like. Finishing station 108 could be a single finishing device or the object can be fed (automatically or manually) through a series of different function 3-D finishing devices.

FIG. 1B illustrates the operation of system for printing 3D objects described in FIG. 1A. In Step 1 121, a sheet is cut to length when used as a build platform and fed into the composite-based additive manufacturing station 150. In Step 2 151, computer aided design (CAD) slices are loaded into the CBAM station. After stacking sheet on removable stacker base like a print media, or previously printed layer each slice is then printed as a layer shape of the object. Note that for a first layer, the printer would print a sacrificial layer onto the removable base like the elevator. In Step 3 153, a polymer powder is deposited onto the printed sheet which sticks to where the sheet is wet from print fluid. In Step 4 155, dry powder not adhering to the sheet is removed. In both Step 3 and Step 4, Pin (or fully cure) new sheet to previous layer of removable base with heated plenum/shoe/iron. Plenum sets proper layer thickness and melts the polymer. Print appropriate cross section and sacrificial stack supports. Selectively deposit polymer powder and remove excess. In Step 5 157, the sheets are stacked in order and heat is applied, to melt the deposited polymer, and then the stack is compress to a final part or object height. In Step 6 181, the un-bonded portions of sheet fibers are removed to net a completed object. The removing could be mechanically or chemically performed.

Figure 2:
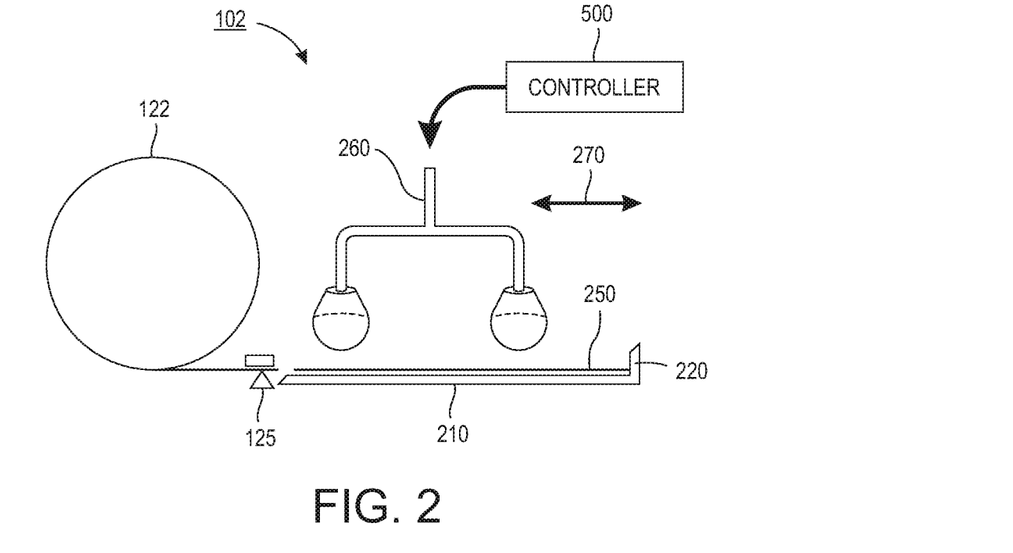
FIG. 2 illustrates a block diagram of a sheeting subsystem with shuttle mechanism used in composite-based additive manufacturing in accordance to an embodiment.

FIG. 2 illustrates a block diagram of a sheeting subsystem with shuttle mechanism used in composite-based additive manufacturing in accordance to an embodiment. As can be seen, a material web 122, i.e. paper web that has been wound up onto a supply roll, is passed to a separating cutting device 125, by way of several deflection and transport rollers, coming from a supply roll, not shown. Separating cutting device 125, e.g. punch cutter and duct cutter, separates a cutout having a predetermined length 220 from material web 122, in known manner Edge guides such as 220 would hold sheet/stack in place, sensors detect when length is correct, and cutting device 125 could be rotary cutter or laser cuter. The separated cutout is transported further to a segment roller, to which suction air is applied, by means of a transport belt device Describing now in further detail this exemplary embodiment with reference to the Figures, there is shown a print media sheet separator and feeder system 102 with a feed head 260, for feeding sheets 250 from a stack 210. As shown in FIG. 2, this sheeting subsystem. Feeder 102 may be a "shuttle feeder" system in which the feed head 260 may be reciprocated substantially parallel to the stack surface after a sheet 250 acquisition for the feeding 270 of that sheet into take-away rollers, and back. Other feeder systems can include or comprise laser and pick and place robot, can accommodate sheets of arbitrary size and shapes as required by the elevator and the like. Further, transitioning sheet to CBAM station 105 could be done by robot arm or other mechanism with similar accuracy or better than feed head 260. Known air knives or air fluffers may be used to help fluff up the stack 210 to assist in the top sheet acquisition by the feed head 260. However, since these aspects of such sheet feeders are well known, they need not be re-described herein. The feed head 260 shown here acquiring the substrate 250, is a vacuum box with multiple vacuum tubes that may drop down to contact the fluffed substrate like sheet 250. When the vacuum is turned on, e.g., by the valve in vacuum input controlled by controller 500 as shown, the vacuum tubes will pull the top sheet up.

Figure 3:
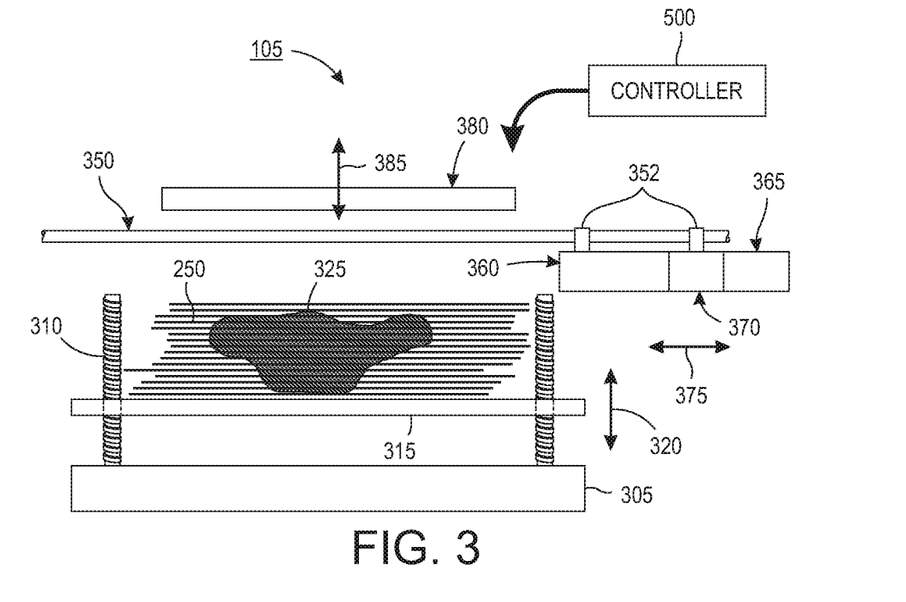
FIG. 3 illustrates a block diagram of a composite-based additive manufacturing station in accordance to an embodiment.

FIG. 3 illustrates a block diagram of a composite-based additive manufacturing station 105 in accordance to an embodiment. CBAM station 105 includes a platform 305, gantry system 350, print head 360, a heated plenum 380, build platform or elevator 315, and computer/controller 500. Single, double, and multiple elevators 315 can build part simultaneously to further improve throughput.

In the illustrative embodiment, gantry system 350 enables print head 360 and coupled powdered deposition device 370 and powder cleaning unit 365 to move in the illustrated directions 375 on guided rails. The print head 360 with powder depositing and cleaning unit are secured on the gantry system 350 by a bracket mechanism that can move in the illustrated directions 375. The gantry system may comprise a dedicated control module or controller 500. The control module may include a motor configured to move the gantry or the components on the gantry relative to the elevator 315 using inputs from sensors such encoders for sensing gantry motion/position.

Print head 360 deposits ink material on build platform such as sheet 250 to sequentially build object 325 with polymer powder in combination with pressure and heat. Elevator 315 is movable in the Y direction 320 (up/down in FIG. 3), such that CBAM 105 provides degrees-of-freedom for building object 325. The elevator rides and is held in place by column/support rails 310. The elevator 315 can accurately decrement 320 the stack approximately the thickness of one sheet 250 and polymer layer thickness. The elevator 315 may be optionally heated to maintain the object, sheet, and powder at a desired temperature.

Heated plenum 380 or heated paten is lowered to apply heat to object 325 on elevator 315 causing the powdered material to melt. Heated plenum 380 can be lowered or raised into position following movement 385. The plenum is made of heat conductive metal and has as entry and exit ports for carrying hot flowing material. In the alternative to the flowing material it is possible to use heat circuits that can be selectively energized to fit different patterns and different sized sheets or objects. In other embodiments various methods may be used to heat the material and sheet during processing by using a heated platen while at an elevated temperature exceeding the melting point of the applied powdered material. The heated platen 380 can selectively or completely cure the previous powdered layer to the newly stacked sheet and the controller 500 can raise (to make way for the Print head array, and other devices on the gantry) and accurately lower the platen onto the stack/sheet/object for curing. As used herein, the term "selectively" curing is inclusive of partially curing where curing can occur on part of the build object/sheet or at selected layers during the build process.

CBAM station 105 also includes controller 500. The controller reads and executes build instructions generated by an outboard computer (not depicted) based on a 3D model of the object that is to be printed (i.e., object 325). For example, controller 500 orchestrates the build by controlling movements of print head 360, the rate at which material is deposited on to build platform like sheet 250 and elevator 315, and the operation of focused heat sources from the heated plenum 380.

Next, an embodiment of the present invention will be described. Note that portions which are the same as those in the previous embodiment described above are denoted by the same reference numerals, and descriptions of the same portions as those as in the previous embodiment will be omitted.

Figure 4:
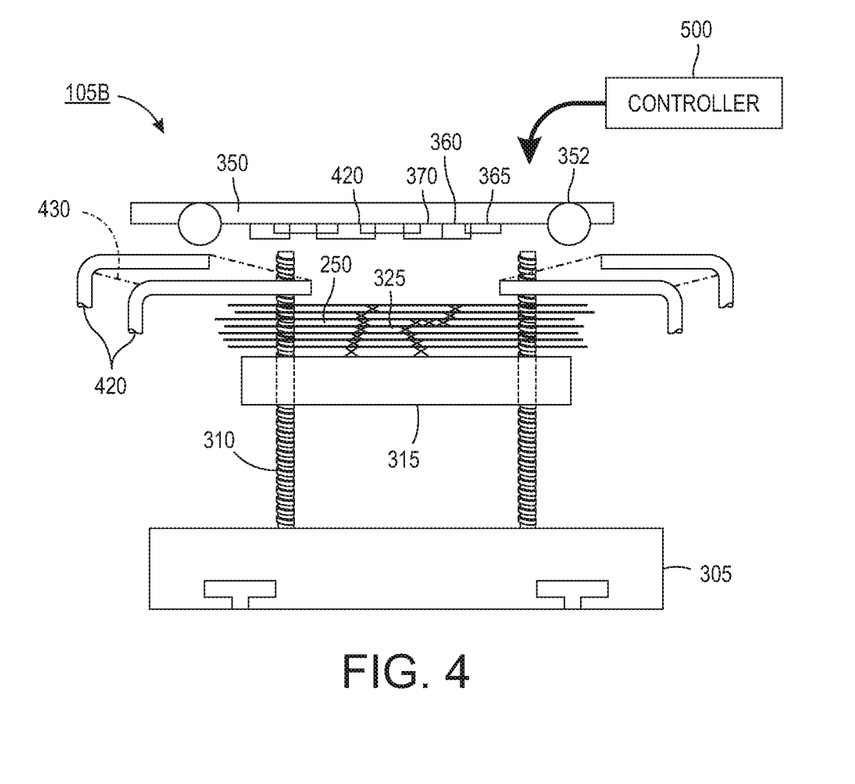
FIG. 4 illustrates a block diagram of an alternative implementation of a composite-based additive manufacturing station in accordance to an embodiment.

FIG. 4 illustrates a block diagram of an alternative implementation of a composite-based additive manufacturing station 105B in accordance to an embodiment.

In this embodiment the heated plenum 380 of the embodiment disclosed in FIG. 3 is replaced with a double clamp 420 that can be moved downward 430 to exert pressure on the stack of sheets 250. As has been previously described the sheet and the rails 310 are used to locate layers and to compact the entire stack after all is printed. Additionally, the gantry in the previous embodiment is now equipped with a heat source 420 so that heat can be applied to the powdered layer. A low melt wax could be used as substitute to bind the layers to each other.

Figure 5:
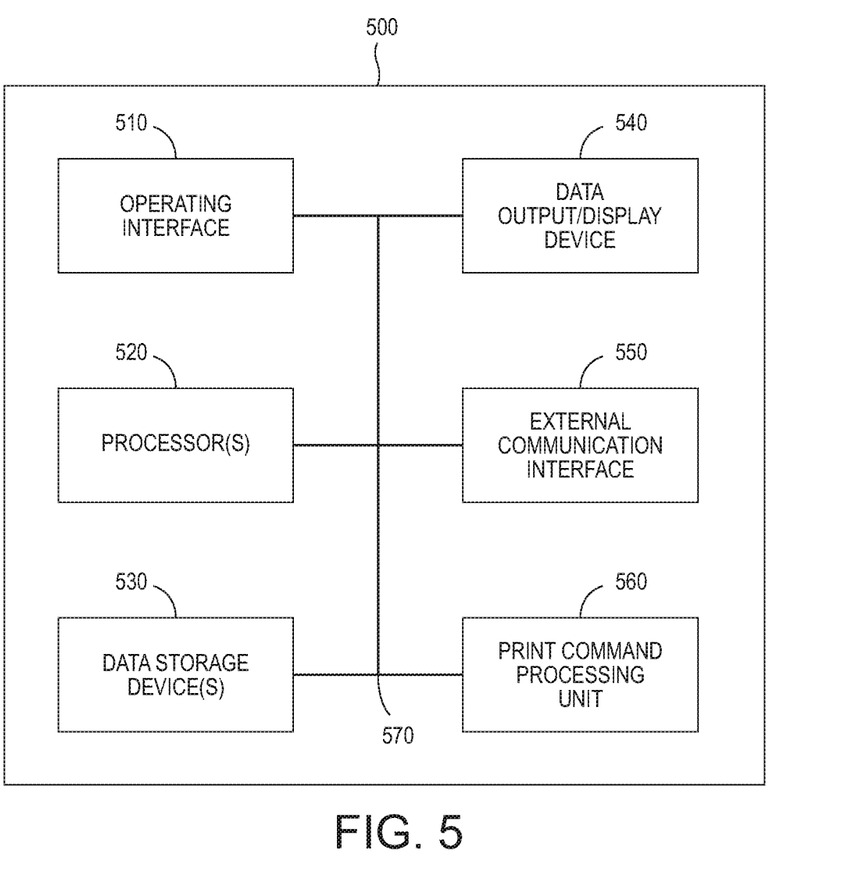
FIG. 5 illustrates a block diagram of a controller with a processor for executing instructions to automatically control devices in the apparatus illustrated in FIG. 2, FIG. 3, and FIG. 4 in accordance to an embodiment.

FIG. 5 illustrates a block diagram of a controller with a processor for executing instructions to automatically control devices in the apparatus illustrated in FIG. 2, FIG. 3, and FIG. 4 in accordance to an embodiment. The exemplary control system 500 may provide input, to or be a component of a controller for executing the AM 2D object forming process in a system such as that depicted in FIGS. 2-4.

The exemplary control system 500 may include an operating interface 510 by which a user may communicate with the exemplary control system 500. The operating interface 510 may be a locally-accessible user interface associated with an AM 3D object forming device. The operating interface 510 may be configured as one or more conventional mechanism common to control devices and/or computing devices that may permit a user to input information to the exemplary control system 500. The operating interface 510 may include, for example, a conventional keyboard, a touchscreen with "soft" buttons or with various components for use with a compatible stylus, a microphone by which a user may provide oral commands to the exemplary control system 500 to be "translated" by a voice recognition program, or other like device by which a user may communicate specific operating instructions to the exemplary control system 500. The operating interface 510 may be a part or a function of a graphical user interface (GUI) mounted on, integral to, or associated with, the AM 3D object forming device with which the exemplary control system 500 is associated.

The exemplary control system 500 may include one or more local processors 520 for individually operating the exemplary control system 500 and for carrying into effect control and operating functions for AM 3D object forming, and specifically for implementing composite-based layer forming scheme, and control of gantry and heated plenum. Processor(s) 520 may include at least one conventional processor or microprocessor that interpret and execute instructions to direct specific functioning of the exemplary control system 500, and control of the AM 3D object forming process with the exemplary control system 500.

The exemplary control system 500 may include one or more data storage devices 530. Such data storage device(s) 530 may be used to store data or operating programs to be used by the exemplary control system 500, and specifically the processor(s) 520. Data storage device(s) 530 may be used to store information regarding, for example, one or more 3D object models for producing 3D objects in an AM 3D object forming device with which the exemplary control system 500 is associated. The stored 3D object model information may be devolved into data for the printing of a series of layers of 2D slices for forming the 3D object in the manner generally described above.

The data storage device(s) 530 may include a random access memory (RAM) or another type of dynamic storage device that is capable of storing updatable database information, and for separately storing instructions for execution of system operations by, for example, processor(s) 520. Data storage device(s) 530 may also include a read-only memory (ROM), which may include a conventional ROM device or another type of static storage device that stores static information and instructions for processor(s) 520. Further, the data storage device(s) 530 may be integral to the exemplary control system 500, or may be provided external to, and in wired or wireless communication with, the exemplary control system 500, including as cloud-based data storage components.

The exemplary control system 500 may include at least one data output/display device 540, which may be configured as one or more conventional mechanism that output information to a user, including, but not limited to, a display screen on a GUI of an AM 3D object forming device with which the exemplary control system 500 may be associated. The data output/display device 540 may be used to indicate to a user a status of an AM 3D object forming operation effected by the device with which the exemplary control system 500 may be associated including an operation of one or more individually controlled components at one or more of a plurality of separate processing stations in the device.

The exemplary control system 500 may include one or more separate external communication interfaces 530 by which the exemplary control system 500 may communicate with components external to the exemplary control system 500 such as gantry and plenum. At least one of the external communication interfaces 530 may be configured as an input port to support connecting an external CAD/CAM device storing modeling information (image data 111) for execution of the control functions in the AM 3D object forming operations. Any suitable data connection to provide wired or wireless communication between the exemplary control system 500 and external and/or associated components is contemplated to be encompassed by the depicted external communication interface 530.

The exemplary control system 500 may include a 2D slice image forming control unit 560 that may be used to control the layer printing process, i.e., print head and powdering unit on the gantry, which produces the series of 2D slices for the in-process 3D object according to devolved 3D object modeling information. The 2D slice image forming control unit 560 may operate as a part or a function of the processor 520 coupled to one or more of the data storage devices 530, or may operate as a separate stand-alone component module or circuit in the exemplary control system 500. Either of the processor 520 or the 2D slice image forming control unit 560 itself may parse the input 3D object model information to determine and execute a layer-by-layer 2D slice material layer printing scheme in the AM 3D object forming device.

The exemplary control system 500 may include a 2D slice fusing/fixing control unit (not shown) as a part or a function of the processor 520 coupled to one or more of the data storage devices 530, or as a separate stand-alone component module or circuit in the exemplary control system 500. The 2D slice fusing/fixing control unit may be usable to control the functioning of one or more of a heat and/or pressure implemented 2D slice layer fixing process according to known methods derived from 2D xerographic image forming operations to join the individual 2D slices to one another.

The exemplary control system 500 may include a 3D object finisher control unit (not shown) for executing a final 3D object shaping scheme on a processed stack of cut and joined 2D slices in a subtractive machining process that may remove the layered support component structure and surface finish the 3D object. As with the above-enumerated other separate control units, the 3D object finisher control unit may operate as a part or a function of the processor 520 coupled to one or more data storage devices 530 for executing finishing device operations, or may operate as a separate stand-alone component module or circuit in the exemplary control system 500.

All of the various components of the exemplary control system 500, as depicted in FIG. 5, may be connected internally, and to one or more AM 3D object forming devices, by one or more data/control busses 570. These data/control busses 570 may provide wired or wireless communication between the various components of the exemplary control system 500, whether all of those components are housed integrally in, or are otherwise external and connected to an AM 3D object forming device with which the exemplary control system 500 may be associated.

It should be appreciated that, although depicted in FIG. 5 as an integral unit, the various disclosed elements of the exemplary control system 500 may be arranged in any combination of sub-systems as individual components or combinations of components, integral to a single unit, or external to, and in wired or wireless communication with the single unit of the exemplary control system 500. In other words, no specific configuration as an integral unit or as a support unit is to be implied by the depiction in FIG. 5. Further, although depicted as individual units for ease of understanding of the details provided in this disclosure regarding the exemplary control system 500, it should be understood that the described functions of any of the individually-depicted components, and particularly each of the depicted control units, may be undertaken, for example, by one or more processors 520 connected to, and in communication with, one or more data storage device(s) 530.

Figure 6A:
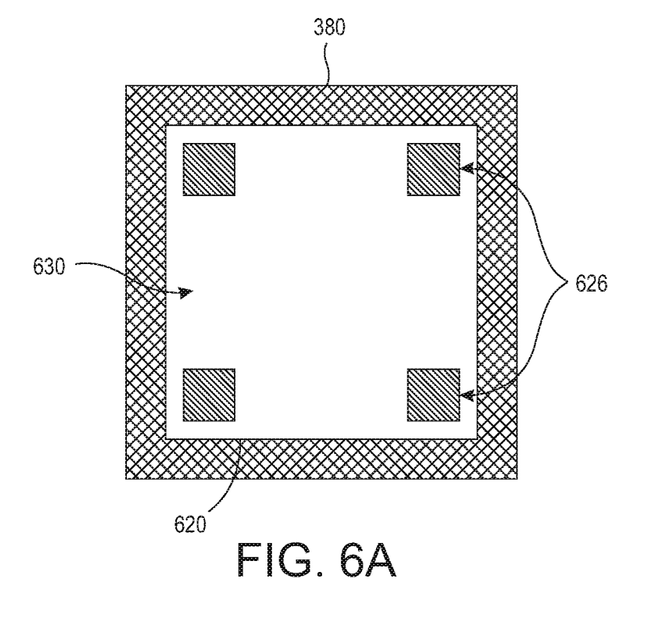
FIG. 6A is a schematic bottom view of a heated platen-facing surface with support columns in accordance to an embodiment.
Figure 6B:
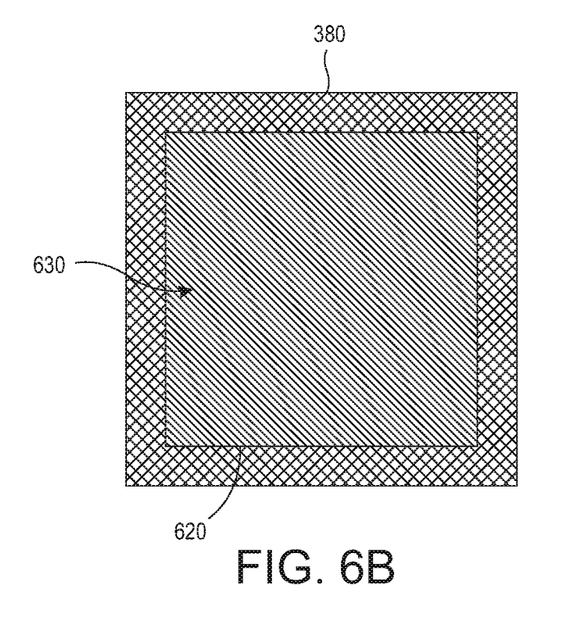
FIG. 6B is a schematic bottom view of a heated flat platen-facing surface in accordance to an embodiment.

FIG. 6A is a schematic bottom view of a heated platen-facing surface with support columns in accordance to an embodiment. FIG. 6B is a schematic bottom view of a heated flat platen-facing surface in accordance to an embodiment In FIG. 6A the heated platen 380 is placed on the elevator 315 and a build surface 620 such as sheet 250 can be stacked thereon. As shown in 6B, selected surfaces 626 are heated to create support columns as part of the layer creation allowing for the stack to be removed and the part sintered as a whole. The object 325 can then be created on a layer-by-layer basis on surface 630. Elimination of part quality being reliant on sheet cut tolerances and sheet stack tolerances by building supports 626 into the part as opposed to stacking on posts. The gantry is then able to build the part in place—layer to layer tolerances driven by print pass to print pass tolerances. Such precision is possible because the gantry is able to position the print head at the same location so that the layer can be built with minimal deviation. The heated platen 380 controls layer thickness by repeatably acting on stack in same position.

Figure 7:
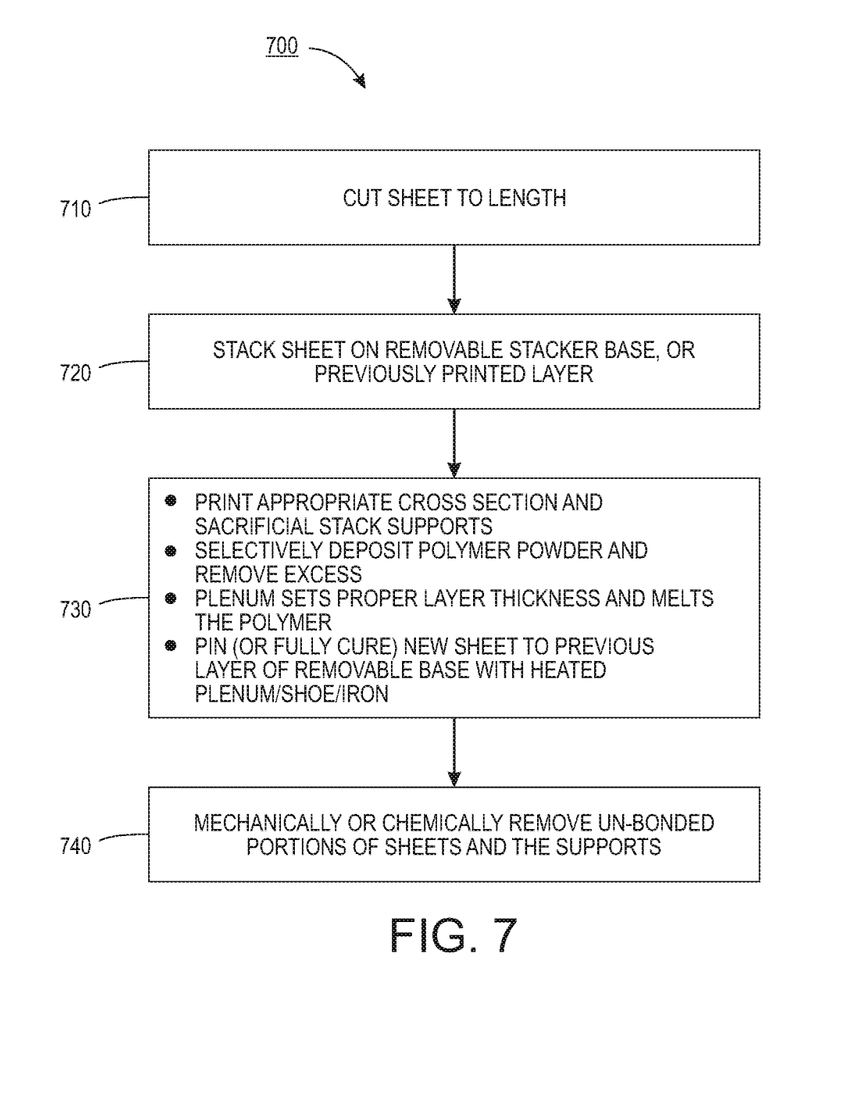
FIG. 7 illustrates a flowchart of a method for printing an object using composite-based additive manufacturing in accordance to an embodiment.

FIG. 7 illustrates a flowchart of method 700 for printing an object using composite-based additive manufacturing in accordance to an embodiment.

As shown in FIG. 7, operation of the method commences at action 710 where the process includes staging a fibrous material such as carbon fiber sheets by potentially cutting to length and placing a sheet onto an elevator such as elevator 315 where in operation is at the top of its travel at around one millimeter (1 mm) gap to the print head (s) 360. The sheet is added to a stack on removable stacker base or previously printed layer as part of action 720. In action 730 the process print appropriate cross section and sacrificial stack supports, selectively deposit polymer powder and remove excess, plenum/platen sets proper layer thickness and melts the polymer, pin (or fully cure) new sheet to previous layer of removable base with heated plenum/shoe/iron. In action 740, mechanically or chemically remove un-bounded portions of sheets and the column support as described in FIG. 6A.

Embodiments have been disclosed that meet the need in the art for improved additive manufacturing because the architecture and process provide the ability to build the supports into the part vs stacking on posts, a gantry system that builds the part in place—layer to layer tolerances correlated to the much smaller print pass to print pass tolerances, heated platen that controls layer thickness by repeatably acting on stack in same position. Further, the embodiments provide for the ability to have a cured/completed part, other than removal of un-printed sheet material, and/or the ability to automate a currently very manual process. Additionally, the disclosed embodiments allow for scalability in that single, double, and multiple elevators can build part simultaneously to further improve throughput.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An object manufacturing system, the system comprising:
   a movable platform to receive a build surface having a thickness;
   a material depositing system configured to deposit a layer of material onto the build surface by using:
      an image forming device to deposit a pattern of fluid in an image-wise fashion on the build surface;
      a powder applicator to deposit an object powder that is configured to adhere to the deposited pattern of fluid on the build surface; and
   a heated plenum having heat conductive material that can be lowered or raised to selectively or completely cure the deposited layer of material on the build surface, the heated plenum being spatially separate from the image forming device and powder applicator, the heated plenum further having a vertical orientation with the image forming device above the build surface with the heated plenum vertically raised above the image forming device for deposition of the pattern of fluid on the build surface;
   wherein each layer of an object is assembled in a stepwise fashion until the entire object is built,
   and the movable platform can decrement by approximately the thickness of the build surface and the deposited layer of material.

2. The object manufacturing system of claim 1, the system further comprising:
   an apparatus to cut the build surface to a predetermined size and to place the build surface on the movable platform.

3. The object manufacturing system of claim 1, wherein the deposited layer of material includes at least one layer to create a support column.

4. The object manufacturing system of claim 3, wherein the heated plenum heats a selected area on the build surface to create the support column.

5. The object manufacturing system of claim 1, the material depositing system further comprising:
   an array of print heads to print a layer shape of the object on the build surface;
   a material deposition apparatus to deposit a powder on the build surface; and
   a cleaning unit to remove deposited powder that is not stuck to the printed layer shape of the object.

6. The object manufacturing system of claim 5, wherein the printed layer shape of the object is formed by a liquid deposited on the build surface.

7. The object manufacturing system of claim 2, wherein the heated plenum heats the deposited layer of material and compresses the deposited layer of material to a predetermined height.

8. The object manufacturing system of claim 1, the system further comprising:
   a controller configured to control plenum motion and plenum applying pressure to selectively or completely cure the deposited layer of material on the build surface.

9. A method of printing an object onto a build platform using a printing system, the method comprising:
   causing a movable platform to receive a build surface having a thickness;
   causing a material depositing system to deposit a layer of material onto the build surface by using,
      an image forming device to deposit a pattern of fluid in an image-wise fashion on the build surface;
      a powder applicator to deposit an object powder that is configured to adhere to the deposited pattern of fluid on the build surface; and
   using a heated plenum having heat conductive material that can be lowered or raised to selectively or completely cure the deposited layer of material on the build surface, the heated plenum being spatially separate from the image forming device and powder applicator, the heated plenum further having a vertical orientation with the image forming device above the build surface with the heated plenum vertically raised above the image forming device for deposition of the pattern of fluid on the build surface;
   wherein each layer of an object is assembled in a stepwise fashion until the entire object is built, and the movable platform can decrement by approximately the thickness of a build surface and deposited layer of material.

10. The method according to claim 9, the method further comprising:
    cutting the build surface to a predetermined size and placing the build surface on the movable platform.

11. The method according to claim 10, wherein the deposited layer of material includes at least one layer column.

12. The method according to claim 11, wherein the heated plenum further providing selected surfaces heated to apply heat to the at least one layer column.

13. The method according to claim 9, the material depositing system further performing:
    causing an array of print heads to print a layer shape of the object on the build surface;
    causing a material deposition apparatus to deposit a powder on the build surface; and
    removing deposited powder that is not stuck to the printed layer shape of the object.

14. The method according to claim 13, wherein the printed layer shape of the object is fluid base.

15. The method according to claim 9, wherein the heated plenum heats the deposited layer of material and compresses the deposited layer of material to a predetermined height.

* * * * *